US012748007B2

(12) United States Patent
Grundy et al.

(10) Patent No.: US 12,748,007 B2
(45) Date of Patent: Sep. 29, 2026

(54) MECHANICAL INDICATOR FOR FLAME ARRESTOR AND METHOD

(71) Applicant: EMERSON PROCESS MANAGEMENT REGULATOR TECHNOLOGIES TULSA, LLC, Tulsa, OK (US)

(72) Inventors: Daniel Grundy, Preston (GB); Stuart Brooks, Bolton (GB)

(73) Assignee: EMERSON PROCESS MANAGEMENT REGULATOR TECHNOLOGIES TULSA, LLC

( * ) Notice: Subject to any disclaimer, the term of this patent is extended or adjusted under 35 U.S.C. 154(b) by 293 days.

(21) Appl. No.: 18/528,537

(22) Filed: Dec. 4, 2023

(65) Prior Publication Data

US 2025/0180425 A1 Jun. 5, 2025

(51) Int. Cl.
*G01L 19/10* (2006.01)
*A62C 3/06* (2006.01)
*A62C 4/00* (2006.01)

(52) U.S. Cl.
CPC ................ *G01L 19/10* (2013.01); *A62C 3/06* (2013.01); *A62C 4/00* (2013.01)

(58) Field of Classification Search
CPC .. G01L 19/10; A62C 3/06; A62C 4/00; A62C 4/02; F23M 11/02
See application file for complete search history.

(56) References Cited

U.S. PATENT DOCUMENTS

| | | | | |
|---|---|---|---|---|
| 3,028,009 A * | 4/1962 | Scavuzzo | F16K 35/00 | 210/90 |
| 3,129,689 A * | 4/1964 | Henderson | B60C 23/02 | 116/DIG. 25 |
| 5,027,740 A * | 7/1991 | Kramer | G01L 19/12 | 116/272 |
| 5,189,979 A * | 3/1993 | Popenoe | G01L 19/12 | 116/276 |
| 5,616,157 A * | 4/1997 | Mead | B01D 46/446 | 116/272 |
| 5,731,523 A * | 3/1998 | Cusumano | H01H 35/24 | 73/709 |
| 8,802,258 B2 * | 8/2014 | Campau | H01M 50/367 | 429/82 |
| 8,984,929 B2 * | 3/2015 | Fanti | G01M 3/2876 | 73/46 |
| 9,032,805 B2 * | 5/2015 | Wakeman | G01L 19/10 | 116/273 |

* cited by examiner

*Primary Examiner* — Kristina M Deherrera
*Assistant Examiner* — Tania Courson
(74) *Attorney, Agent, or Firm* — MARSHALL, GERSTEIN & BORUN LLP

(57) ABSTRACT

A mechanical indicator for a flame arrestor including a housing configured to be a coupled to a flame arrestor and having a channel, a sensing assembly disposed within the housing and in fluid communication with the channel, the sensing assembly including a sensing area configured to sense pressure, and a pin disposed within the channel. The pin is moveable between an unactuated position and an actuated position, and the actuated position is a position in which the pin extends outside of the housing providing a visual indicator an event occurred within the flame arrestor. The pin is moved from the unactuated position to the actuated position upon the sensing area sensing pressure exceeding a threshold value.

15 Claims, 4 Drawing Sheets

B-B

C-C

MECHANICAL INDICATOR FOR FLAME ARRESTOR AND METHOD

TECHNICAL FIELD

The present disclosure relates to flame arrestors and, in particular, a mechanical indicator for a flame arrestor.

BACKGROUND

Generally, flame arrestors are well known heat sinks used for a variety of purposes. In one example, the flame arrestor is disposed between a flame and a source of fuel in a flow control system. The flame wants to find a fuel source, and the flame arrestor sits between an explosion and a fuel source and takes the heat and pressure out of the flame as the flame tries to pass through the flame arrestor. In one known example, the flame arrestor does this by having the flame pass through an element within the flame arrestor. The element typically includes tiny cells and metal of foil that together dissipate the heat and pressure of the flame. When purchasing flame arrestors, customers often ask how it is possible to know if and when there has been an event, such as a high pressure and/or a flame event, within the flame arrestor, as the flame arrestor is a sealed unit without light. While some conventional solutions available include temperature probes and light sensors within the flame arrestor that help identify if an event occurred, such solutions and accessories are expensive and require an electrical signal/power source.

SUMMARY

In accordance with a first exemplary aspect, a mechanical indicator for a flame arrestor of a flow control system comprises a housing configured to be a coupled to a flame arrestor, the housing having a channel disposed along a longitudinal axis of the housing. A sensing assembly is disposed within the housing and in fluid communication with the channel of the housing, and the sensing assembly includes a sensing area configured to sense pressure. A pin is disposed within the channel and moveable between an unactuated position and an actuated position. The actuated position is a position in which the pin extends outside of the housing providing a visual indicator an event occurred within the flame arrestor. The pin is moved from the unactuated position to the actuated position upon the sensing area sensing pressure at or exceeding a threshold value.

In accordance with a second exemplary aspect, a flame arrestor for a flow control system comprises a body having an interior portion and a fluid flow path disposed through the interior portion, an element disposed within the body and in fluid communication with the fluid flow path, and an indicator coupled to a portion of the body. The indicator is in fluid communication with the fluid flow path of the body and comprises a housing having a channel and a sensing assembly disposed within the housing and in fluid communication with the channel of the housing. The sensing assembly includes a sensing area configured to sense pressure from the fluid flow path of the flame arrestor. A pin is disposed within the channel and moveable between an unactuated position and an actuated position. The actuated position is a position in which the pin extends outside of the housing of the indicator, providing a visual indicator an event occurred within the flame arrestor.

In accordance with another exemplary aspect of the present disclosure, a method of indicating an event occurred within a flame arrestor of a flow control system comprises coupling a mechanical indicator to a flame arrestor and sensing pressure in a fluid flow path of the flame arrestor via a sensing assembly of the mechanical flame arrestor in fluid communication with the fluid flow path of the flame arrestor. The method also comprises moving a pin of the mechanical indicator from an unactuated position to an actuated position in which the pin extends outside of the housing upon sensing pressure, via a sensing area of the sensing assembly, exceeding a threshold value.

In further accordance with any one of the foregoing exemplary aspects, the mechanical indicator, the flame arrestor and/or the method of indicating an event occurred within the flame arrestor may further include any one or more of the following preferred forms.

In some preferred forms, the mechanical indicator may further comprise a locking member disposed within the housing and configured to engage a portion of the pin to prevent further movement of the pin in the actuated position. In addition, the pin may further comprise a notch, and the locking member may be configured to engage the notch of the pin to prevent further movement of the pin when the pin is in the actuated position.

In other preferred forms, the sensing assembly may comprise a diaphragm, and a portion of the diaphragm may be disposed in the channel.

In still other preferred forms, the housing may include a first housing portion and a second housing portion coupled to the first housing portion, the first housing portion including the pin. The channel may extend through the first and second housing portions. In addition, the indicator may further comprise at least one seal disposed between the first housing portion and the second housing portion.

In still other preferred forms, the sensing assembly may include a first seat disposed near the second end of the channel and including the sensing area, a second seat in contact with a portion of the pin, and a spring disposed between the first and second seats. When pressure applied to the sensing area of the first seat exceeds a counteracting spring force of the spring, the spring moves the second seat and pin into the actuated position, providing a visual indication of the pin outside of the housing. In addition, the at least one seal may be disposed between each of the first and second seats and a portion of the housing in which the first and second seats are disposed.

In other forms, the channel may include a first end and a second end, and the pin may be disposed within the channel at the first end of the channel. In addition, the sensing area may be configured to sense pressure from the second end of the channel.

In still other forms, the pin may be moved from the unactuated position to the actuated position upon the sensing area sensing pressure in the channel exceeding a threshold value.

In other forms, sensing pressure in a fluid flow path of the flame arrestor via a sensing assembly of the mechanical flame arrestor in fluid communication with the fluid flow path of the flame arrestor may comprise sensing pressure in the fluid flow path of the flame arrestor via a diaphragm disposed in a channel of a housing of the mechanical indicator.

In still other preferred forms, sensing pressure in a fluid flow path of the flame arrestor via a sensing assembly of the mechanical flame arrestor in fluid communication with the fluid flow path of the flame arrestor may comprises sensing pressure via at least one valve seat having the sensing area.

In other preferred forms, coupling a mechanical indicator to a flame arrestor may comprise coupling a portion of a housing of the mechanical indicator to a portion of a body of a flame arrestor including providing fluid communication between the housing of the mechanical indicator and a fluid flow path of the body of the flame arrestor.

In still other preferred forms, the method may further comprise engaging a locking member disposed in a housing of the mechanical indicator with a portion of the pin, the locking member engaging a notch of the pin when the pin is in the actuated position, preventing further movement of the pin in the actuated position.

Any one or more of these aspects may be considered separately and/or combined with each other in any functionally appropriate manner. In addition, any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

BRIEF DESCRIPTION OF THE DRAWINGS

The features of this disclosure which are believed to be novel are set forth with particularity in the appended claims. The present disclosure may be best understood by reference to the following description taken in conjunction with the accompanying drawings, in which like reference numerals identify like elements in the several figures, in which:

DETAILED DESCRIPTION

A mechanical indicator for a flame arrestor of a flow control system is disclosed. The indicator includes a housing configured to be coupled to the flame arrestor and the housing has a channel disposed along a longitudinal axis of the housing. A sensing assembly is disposed within the housing and is in fluid communication with the channel of the housing. The sensing assembly includes a sensing area configured to sense fluid, such as pressure, for example. A pin is disposed within the channel and is moveable between an unactuated position and an actuated position. The actuated position is a position in which the pin extends outside of the housing providing a visual indicator an event occurred within the flame arrestor. The pin is moved from the unactuated position to the actuated position upon the sensing area sensing pressure exceeding a threshold value. By using the pressure within the flame arrestor to operate the indicator, a cheaper, mechanical solution is provided that does not require an electrical power source yet still provides a visual warning a flame event occurred within the flame arrestor of the flow control system.

Figure 1:
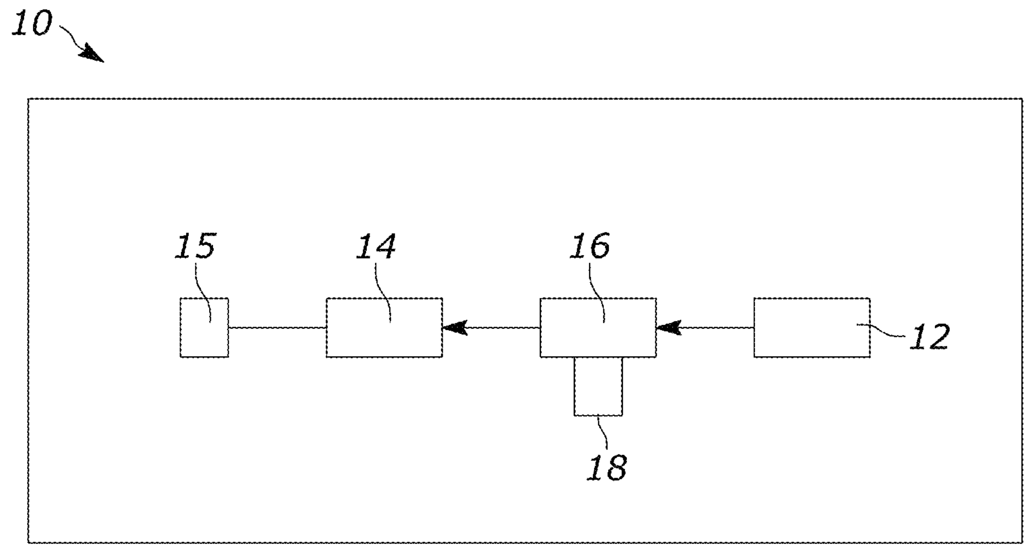
FIG. 1 is a block diagram depicting an exemplary flow control system having at least one flame arrestor with a mechanical indicator of the present disclosure.

Referring now to FIG. 1, an exemplary flow control system having at least one flame arrestor with a mechanical indicator of the present disclosure is depicted. More specifically, the flow control system 10 includes a source of fuel 12 that flows through pipework to various components of the flow control system 10. The flow control system 10 also includes one or more valves 14 that control the flow of the fluid, such as fuel, from the source of fuel 12 and throughout the system 10. The flow control system 10 also includes an ignition source 15. In this example, a flame arrestor 16 is disposed between the source of fuel 12 and the ignition source 15, and a mechanical indicator 18 of the present disclosure is coupled to the flame arrestor 16. It will be appreciated that the flow control system 10 may include various other components that are known to those having skill in the art that are not depicted in FIG. 1. In addition, while one valve 14 and one flame arrestor 16 are depicted, it will also be appreciated that several more valves and/or flame arrestors 16 may be included within the flow control system 10 and still fall within the scope of the present disclosure.

Figure 2:
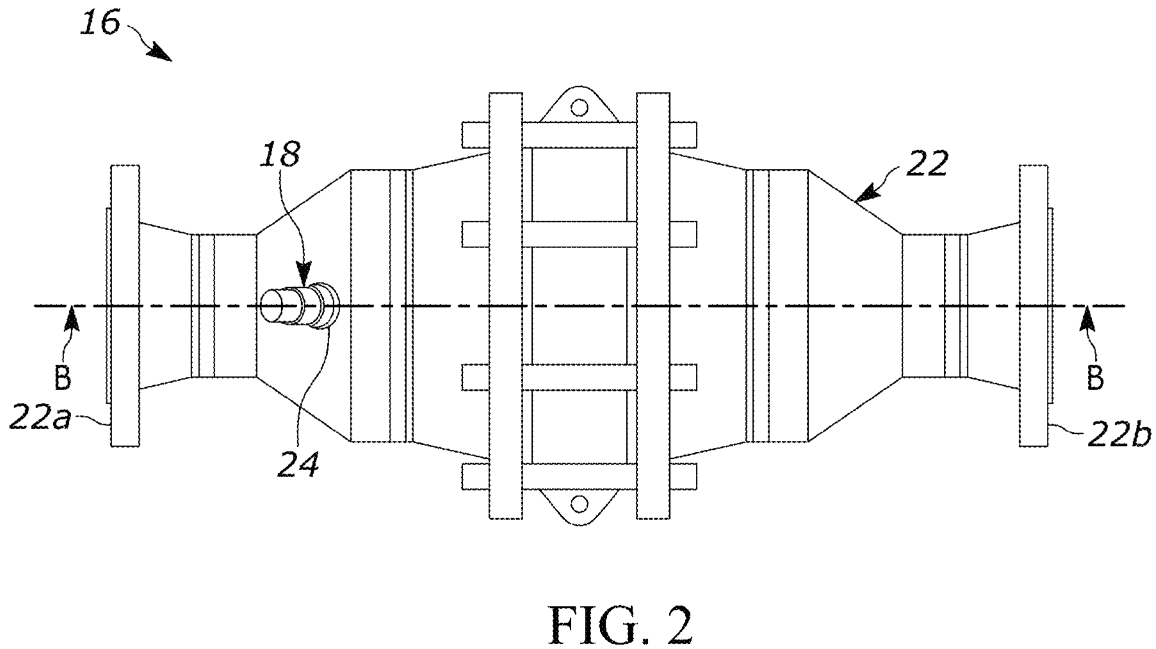
FIG. 2 is a top perspective view of a flame arrestor of FIG. 1 having the indicator of the present disclosure.
Figure 3:
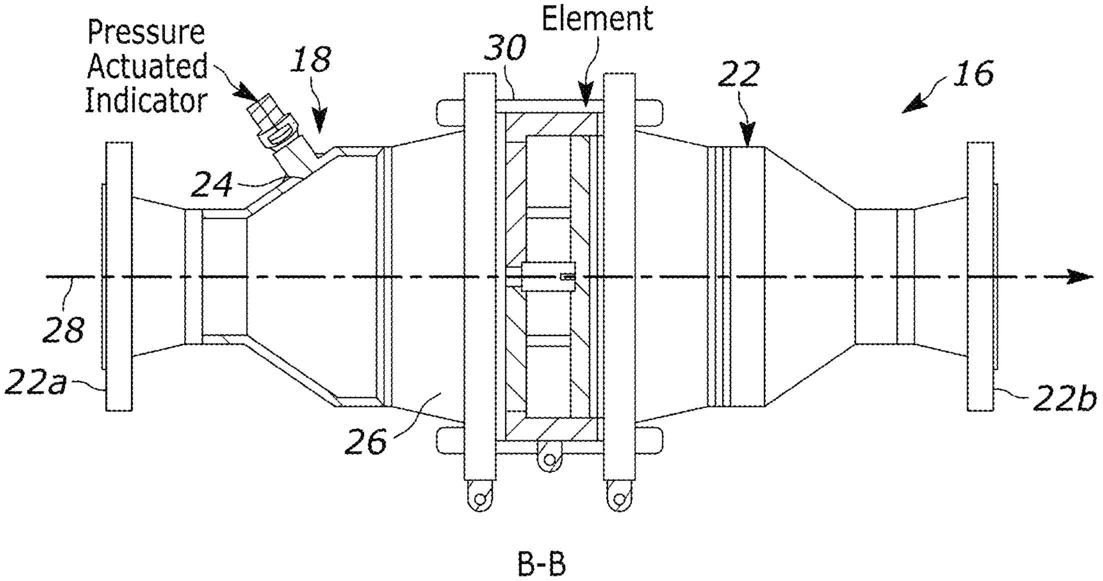
FIG. 3 is a cross-sectional view of the flame arrestor of FIG. 2 taken along the line B-B of FIG. 2.

Referring now to FIGS. 2 and 3, the flame arrestor 16 of FIG. 1 is depicted in more detail. The flame arrestor 16 includes a body 22 and an orifice 24 disposed on the body and configured to receive a portion of the mechanical indicator 18. As depicted in FIG. 3, the body 22 includes an interior portion 26 and a fluid flow path 28 disposed throughout the interior portion 26 of the body 22. In one example, the body 22 includes a first end **22*a* and a second end 22*b* disposed opposite to the first end 22*a*. In this example, the fluid flow path 28 extends from the first end 22*a* to the second end 22*b* of the body 22 of the flame arrestor 16. An element 30 is also disposed within the body 22 between the first end 22*a* and the second 22*b*. The element 30 is the component within the flame arrestor 16 that stops a flame, for example. In this example, the element 30 is disposed in a central area of the body 20 and in a position approximately equidistant between the first and second ends 22*a*, 22*b* of the body 22. The element 30 is in fluid communication with the fluid flow path 28. Said another way, the fluid flow path 28 extends along the entire interior portion 26 of the body 22 from the first end 22*a* to the second end 22*b* and through the element 30. The mechanical indicator 18 is disposed coupled to a portion of the body 22 on an unprotected side of the flame arrestor 16 and in this example, the orifice 24 of the body 22. As a result, the indicator 18 is also in fluid communication with the fluid flow path 28 of the body 22. The unprotected side of the flame arrestor 16** is a side in which the pressure and heat from an explosion and/or event, such as the flame event, is able to be detected.

Figure 4:
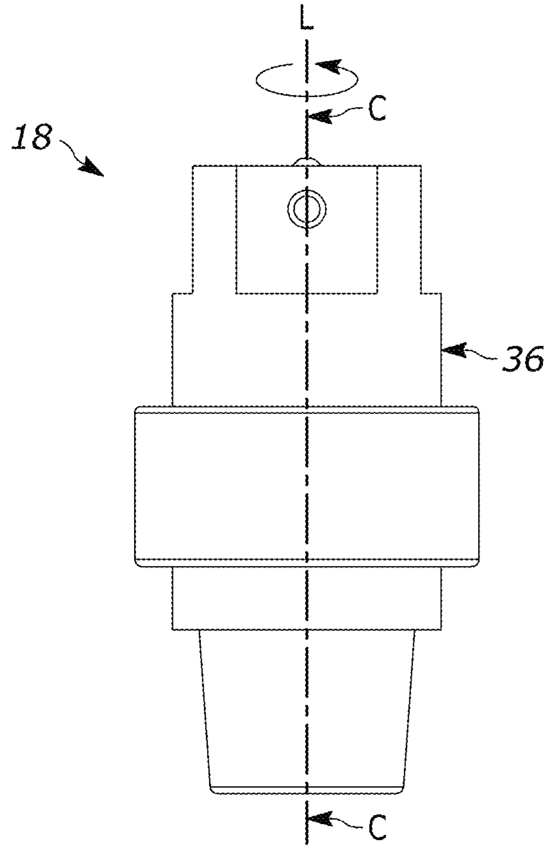
FIG. 4 is a front, perspective view of the indicator of FIGS. 2 and 3 in an unactuated position.
Figure 5:
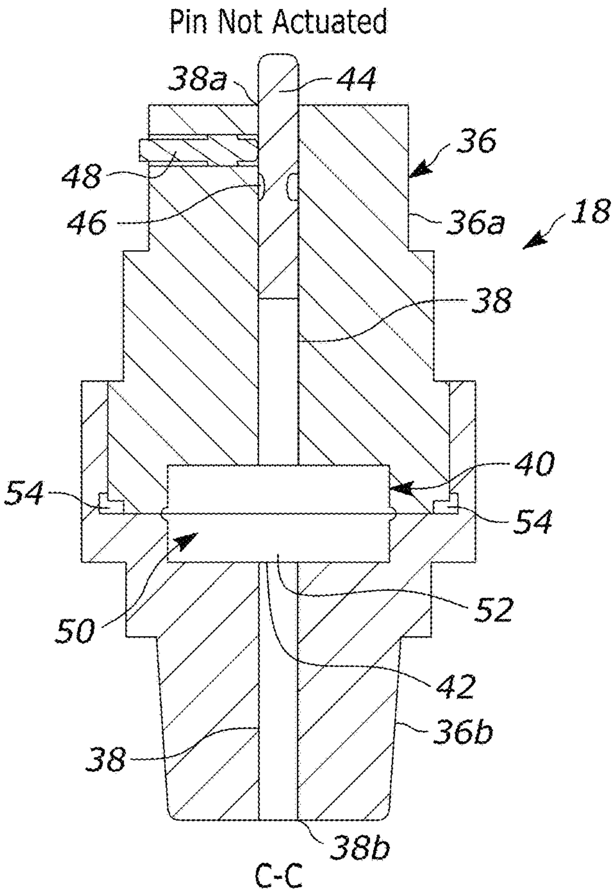
FIG. 5 is a cross-sectional view of the indicator of FIG. 4 taken along the line C-C in FIG. 4.
Figure 6:
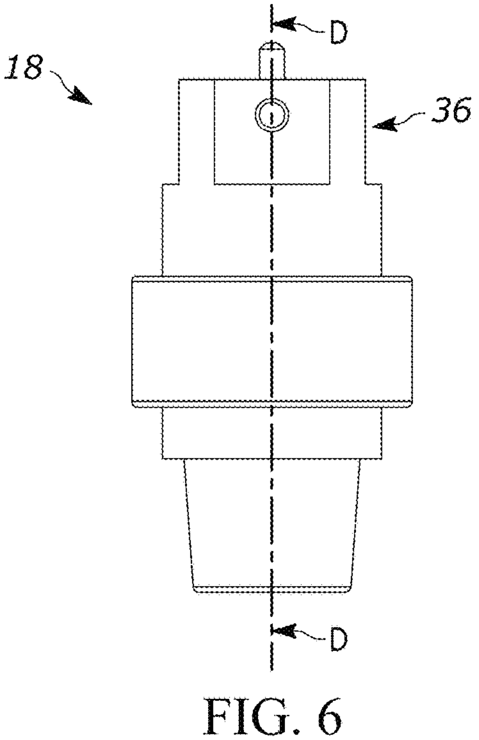
FIG. 6 is a front, perspective view of the indicator of FIGS. 2 and 3 in an actuated position.
Figure 7:
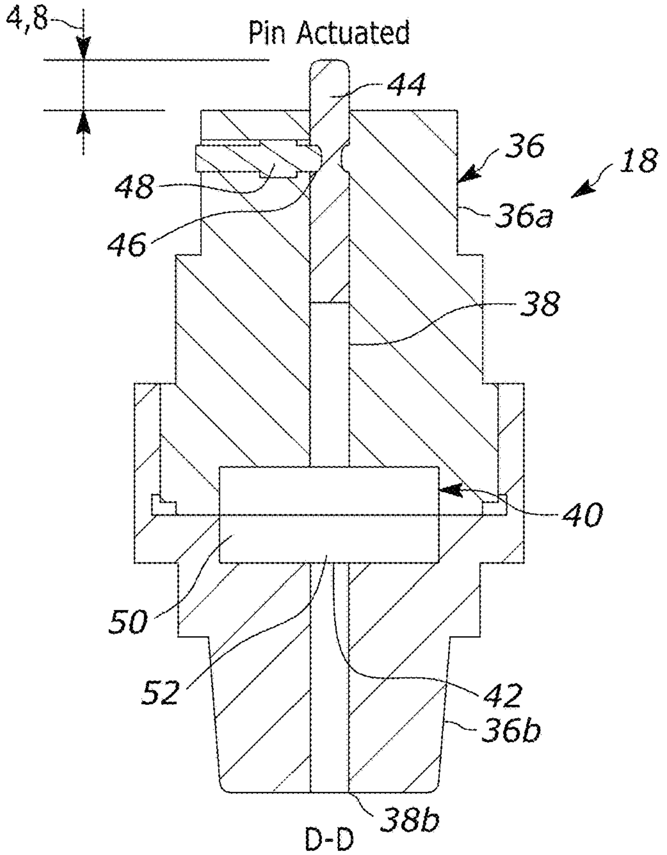
FIG. 7 is a cross-section view of the indicator of FIG. 6 taken along the line D-D of FIG. 6.

Referring now to FIGS. 4-5, the mechanical indicator 18 is depicted in an unactuated position. The indicator 18 includes a housing 36 having a longitudinal axis L and configured to be coupled to the flame arrestor 16, as depicted in FIGS. 2 and 3, for example. The housing 36 includes a channel 38, as depicted in FIG. 5, that is disposed along the longitudinal axis L of the housing 36. A sensing assembly 40 is disposed within the housing 36 and is in fluid communication with the channel 38 of the housing 36. The sensing assembly 40 includes a sensing area 42 configured to sense fluid, such as pressure, from the fluid flow path 28 of the flame arrestor 16, for example. In one example, the sensing area 42 includes a diameter of about 15 mm. It will be appreciated that the diameter of the sensing area 42 may be greater than or less than 15 mm and still fall within the scope of the present disclosure. A pin 44 is disposed within the channel 38 and the pin is moveable between an unactuated position, which is depicted in FIGS. 4 and 5, and an actuated position, which is depicted in FIGS. 6 and 7, as explained more below. The pin 44 is moved from the unactuated position to the actuated position upon the sensing area 42 sensing pressure at or exceeding a threshold value. Said another way, when pressure sensed is at or exceeds the threshold value, the pressure within the channel 38 moves the pin 44 from the unactuated position to the actuated position.

In one example, the threshold value of the pressure is about 0.75+/−0.25 BARG, indicating an event, such as a flame event within the flame arrestor 16. This compares to a normal operating value of the pressure under normal operation conditions, which in one example is in a range of about 0.10 BARG to about 0.30 BARG, e.g., not much more than atmospheric pressure. It is generally known that when a flame event occurs, a surge in pressure of approximately 10 times an operating pressure is witnessed with the flame arrestor.

The channel 38 includes a first end **38*a* and a second end 38*b* disposed opposite to the first end 38*a*, and the pin 44 is disposed in the channel 38 at least one of near or at the first end 38*a* of the channel and as depicted in FIG. 5. The pin 44 also includes a notch 46, and the sensing area 42 is configured to sense fluid, such as pressure, from the second end 38*b* of the channel 38**.

In addition and in one example, the mechanical indicator 18 includes a locking member 48 that is disposed within the housing 36 and configured to engage a portion of the pin 44 to prevent further movement of the pin 44 in the actuated position. For example, the locking member 48 engages the notch 46 of the pin 44 to prevent further movement of the pin 44 when the pin 44 is in the actuated position, as depicted in FIG. 7 and explained more below.

Moreover, in this example, the sensing assembly 40 includes a diaphragm 50 and a portion 52 of the diaphragm 50 is disposed in the channel 38, as depicted in FIG. 5, for example. Further, the housing 36 includes a first housing portion **36*a* and a second housing portion 36*b* coupled to the first housing portion 36*a*, and the first housing portion 36*a* includes the pin 44 in this example. The channel 38 extends through each of the first and second housing portions 36*a*, 36*b*, and the mechanical indicator 18 also includes at least one seal 54 disposed between the first housing portion 36*a* and the second housing portion 36*b*. In this example, the at least one seal 54 includes two seals 54 disposed between the first housing portion 36*a* and the second housing portion 36*b*. It will be appreciated that more than two seals may alternatively be used and still fall within the scope of the present disclosure. The seals 54 ensure that the environment is sealed from the fuel source 15 (FIG. 1). In addition, in this example, the pin 44 is not in direct contact with the sensing assembly 40 including the diaphragm 50. Rather, there is a space within the channel 38 between the diaphragm 50 and the pin 44, as depicted in each of FIGS. 5 and 7, which allows fluid, such as gas and/or pressure, to flow through the channel 38 and diaphragm 50 and under the pin 44 that pushes the pin 44 to the actuated position of FIGS. 6 and 7**.

Referring now to FIGS. 6 and 7, the mechanical indicator 18 is depicted in an actuated position. In the actuated position, the pin 44 extends outside of the housing 36 and provides a visual indicator that an event, such as high pressure and/or flame event, occurred within the flame arrestor 16. As depicted in FIG. 7, when the pin 44 is in the actuated position, the notch 46 engages the locking member 48, which prevents the pin 44 from extending too far or entirely out of the housing 36. In other words, the locking member 48 engages the notch 46 of the pin 44 as the pin 44 moves from the unactuated position of FIG. 5, for example, to the actuated position of FIG. 7, for example, essentially locking the pin 44 in a position that extends just outside the housing 36 so the pin 44 is able to provide the visual indication to a user that the flame event occurred. Once identified and inspected, for example, the user may then push the pin 44 extending outside of the housing 36, such as in FIG. 7, back into the housing 36 such that a tip of the pin 44 is essentially disposed back into the housing 36. The locking member 48 is then disengaged from the notch 46 of the pin 44, and the pin 44 is then returned to the unactuated position of FIG. 5, for example. Said another way, the user may reset the pin 44 from the actuated position to the unactuated position by pushing the tip of the pin 44 back into the housing 36.

Figure 8:
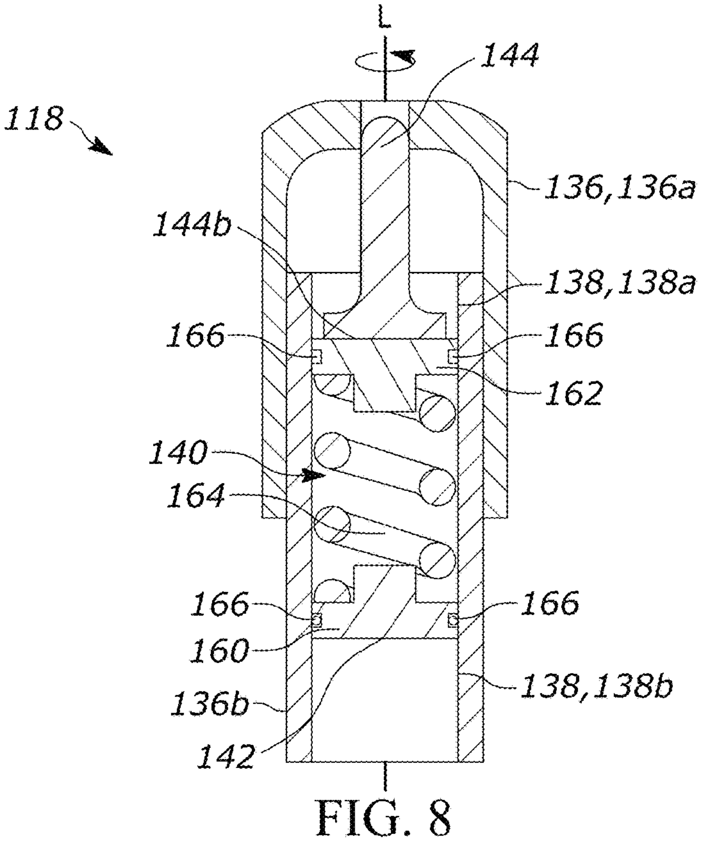
FIG. 8 is a cross-sectional view of another mechanical indicator of the present disclosure.

Referring now to FIG. 8, another mechanical indicator 118 that may be used with the flame arrestor 16 of FIGS. 2 and 3, for example, is depicted in accordance with another aspect of the present disclosure. The mechanical indicator 118 is similar to the mechanical indicator 18 described above. Elements of the mechanical indicator 118 that are similar to or the same as elements of the mechanical indicator 18 have a reference numeral 100 more than the reference numerals used for the mechanical indicator 18 described above. Some differences between the mechanical indicator 118 and the mechanical indicator 18 include that the mechanical indicator 118 has a two seats and a spring that comprise a sensing assembly as opposed to the diaphragm 50 of the sensing assembly 40 of the mechanical indicator 18, as explained more below. However, the parts and functions of the mechanical indicator 118 of FIG. 8 that are the same or essentially the same as the mechanical indicator 18 described above are not repeated here again for the sake of brevity.

As depicted in FIG. 8, the mechanical indicator 118 includes a housing 136 having a first housing portion **136*a* and a second housing portion 136*b* coupled to the first housing portion 136*b*. While the first and second housing portions 136*a*, 136*b* are depicted as separate components in FIG. 8, it will be appreciated that the first and second housing portions 136*a*, 136*b* may alternatively include a single-piece construction and still fall within the scope of the present disclosure. The housing 136 is configured to be coupled to the flame arrestor 16 and includes a channel 138 disposed along a longitudinal axis L of the housing 136. The channel 138 includes a first end 138*a* and a second end 138*b* disposed opposite to the first end 138*a*. A sensing assembly 140 is disposed within the housing 136 and in fluid communication with the channel 138 and including a sensing area 142 configured to sense a fluid, such as pressure, flowing through the channel 138, for example. A pin 144 is disposed within the channel 138, such as near and/or at the first end 138*a* of the channel 138) and is moveable between an unactuated position, as depicted in FIG. 8, to an actuated position (not shown). The actuated position is a position in which the pin 144 extends outside of the housing 136, providing a visual indicator an event, such as a flame event, occurred within the flame arrestor 16. The pin 144 is moved from the unactuated position to the actuated position upon the sensing area 142** sensing pressure exceeding the threshold value, such as about 0.75+/−0.25 BARG, in one example.

In this example, the sensing assembly 140 includes a first seat 160 disposed near the second end 138*b* of the channel 138 and including the sensing area 142, and a second seat 162 in contact with a portion 144*b* of the pin 144. A spring 164 is disposed between the first and second seats 160, 162. When the pressure applied to the sensing area 142 of the first seat 160 exceeds a counteracting spring force of the spring 164, the first seat 160 moves the spring 164 and the second seat 162 and the pin 144 into the actuated position, providing the visual indication of the pin 144 outside of the housing 136. In addition, at least one seal 166, such as an O-ring, is disposed between each of the first and second seats 160, 162 and a portion of the housing 136, such as the second housing portion 136*b*, of the indicator 118 in which the first and second seats 160, 162 are disposed. The seals 166 again provide and ensure a sealed environment, such as from the fuel source 15 (FIG. 1).

In view of the foregoing, it will be appreciated that the mechanical indicators 18, 118 of the present disclosure visually indicate an event, such as the flame event, occurred within the flame arrestor 16 of the flow control system 10 according to one or more of the follow methods. Specifically, a method of indicating an event occurred with the flame arrestor 16 includes coupling the mechanical indicator 18, 118 to the flame arrestor 16 and sensing pressure in the fluid flow path 28 (FIG. 3) of the flame arrestor 16 via the sensing assembly 40, 140 of the mechanical indicator 18, 118. The mechanical indicator 18, 118 is in fluid communication with the fluid flow path 28 of the flame arrestor 16. In addition, the method further includes moving the pin 44, 144 of the mechanical indicator 18, 118 from the unactuated position to the actuated position in which the pin 44, 144 extends outside of the housing 36, 136 upon sensing pressure, via the sensing area 42, 142 of the sensing assembly 40, 140, exceeding a threshold value.

In one example, sensing pressure in the fluid flow path 28 (FIG. 3) of the flame arrestor 16 via the sensing assembly 40, 140 of the mechanical indicator 18, 118 may comprise sensing pressure in the fluid flow path 28 of the flame arrestor 16 via the diaphragm 50 disposed in a channel 38 of the housing 36 of the mechanical flame arrestor 18. In another example, sensing pressure in the fluid flow path 28 (FIG. 3) of the flame arrestor 16 via the sensing assembly 40, 140 of the mechanical indicator 18, 118 may comprise sensing via at least one valve seat 160 having the sensing area 142.

In another example, coupling the mechanical indicator 18, 118 to the flame arrestor 16 may comprise coupling a portion of the housing 36, 136 of the mechanical indicator 18, 118 to a portion of the body 22 of the flame arrestor 16 including providing fluid communication between the housing 36, 136 of the mechanical indicator 18, 118 and a fluid flow path 28 of the body 22 of the flame arrestor 16. In yet another example, the method may further comprise engaging the locking member 48 disposed in the housing 36 of the mechanical indicator 18 within a portion of the pin 44, the locking member 48 engaging the notch 46 of the pin 44 when the pin is in the actuated position, preventing further movement of the pin 44 in the actuated position.

In view of the foregoing, it will be appreciated that the mechanical indicator 18, 118 and related methods include at least the following advantages. For example, the mechanical indicator 18 uses pressure behavior of an event, such as a flame event, within the flame arrestor 16 to create an inexpensive mechanical solution by providing an visual warning an event occurred within the system. Because the mechanical indicator 18 and related methods of the present disclosure utilize the pressure behavior of an event within the flame arrestor, a power source is not needed. For at least this reason, the mechanical indicator is easier to manufacture and use for a variety of applications, such as within the flow control system 10.

The figures and description provided herein depict and describe preferred embodiments of a mechanical indicator for a flame arrestor and a related method for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A mechanical indicator for a flame arrestor of a flow control system, the indicator comprising:

a housing configured to be a coupled to the flame arrestor, the housing having a channel disposed along a longitudinal axis of the housing, the channel including a first end and a second end;

a sensing assembly disposed within the housing and in fluid communication with the second end of the channel of the housing, the sensing assembly including a sensing area configured to sense pressure from the second end of the channel; and a pin disposed within the channel at the first end of the channel, the channel disposed between the pin and the sensing assembly, and the pin moveable between an unactuated position and an actuated position, the actuated position a position in which the pin extends outside of the housing providing a visual indicator an event occurred within the flame arrestor, where the pin is moved from the unactuated position to the actuated position upon the sensing area sensing pressure at or exceeding a threshold value.

2. The indicator of claim 1, wherein the sensing assembly comprises a diaphragm, and a portion of the diaphragm is disposed in the channel.

3. The indicator of claim 1, wherein the housing includes a first housing portion and a second housing portion coupled to the first housing portion, the first housing portion including the pin, and the channel extending through the first and second housing portions, the indicator further comprising at least one seal disposed between the first housing portion and the second housing portion.

4. The indicator of claim 1, wherein the channel includes a first end and a second end, the pin is disposed within the channel at the first end of the channel, and the sensing area is configured to sense pressure from the second end of the channel.

5. The indicator of claim 1, further comprising a locking member disposed within the housing and configured to engage a portion of the pin to prevent further movement of the pin in the actuated position.

6. The indicator of claim 5, the pin further comprising a notch, the locking member configured to engage the notch of the pin to prevent further movement of the pin when the pin is in the actuated position.

7. A flame arrestor for a flow control system, the flame arrestor comprising:

a body having an interior portion and a fluid flow path disposed through the interior portion;

an element disposed within the body and in fluid communication with the fluid flow path; and an indicator coupled to a portion of the body, the indicator in fluid communication with the fluid flow path of the body and comprising:

a housing having a channel, the channel including a first end and a second end;

a sensing assembly disposed within the housing and in fluid communication with the second end of the channel of the housing, the sensing assembly including a sensing area configured to sense pressure from the second end of the channel from the fluid flow path of the flame arrestor; and a pin disposed within the channel at the first end of the channel, the channel disposed between the pin and the sensing assembly, and moveable between an unactuated position and an actuated position, the actuated position a position in which the pin extends outside of the housing of the indicator, providing a visual indicator an event occurred within the flame arrestor.

8. The flame arrestor of claim 7, wherein the pin is moved from the unactuated position to the actuated position upon the sensing area sensing pressure in the channel exceeding a threshold value.

9. The flame arrestor of claim 7, the indicator further comprising a locking member disposed within the housing, and the pin further comprising a notch, the locking member configured to engage the notch of the pin to prevent further movement of the pin when the pin is in the actuated position.

10. The flame arrestor of claim 7, wherein the sensing assembly comprises a diaphragm, and a portion of the diaphragm is disposed in the channel.

11. The flame arrestor of claim 7, wherein the housing includes a first housing portion and a second housing portion coupled to the first housing portion, the first housing portion including the pin, and the channel extending though the first and second housing portions, the indicator further comprising at least one seal disposed between the first housing portion and the second housing portion.

12. A method of indicating an event occurred within a flame arrestor of a flow control system, the method comprising:

coupling a mechanical indicator to the flame arrestor;

sensing pressure in a fluid flow path of the flame arrestor via a sensing assembly of the flame arrestor in fluid communication with the fluid flow path of the flame arrestor, the sensing assembly including a sensing area configured to sense pressure from a second end of a channel of a housing from the fluid flow path of the flame arrestor; and moving a pin of the mechanical indicator from an unactuated position to an actuated position in which the pin extends outside of the housing upon sensing pressure, via a sensing area of the sensing assembly, exceeding a threshold value, the pin disposed within the channel at a first end of the channel, the channel disposed between the pin and the sensing assembly.

13. The method of claim 12, wherein sensing pressure in a fluid flow path of the flame arrestor via the sensing assembly of the flame arrestor in fluid communication with the fluid flow path of the flame arrestor comprises sensing pressure in the fluid flow path of the flame arrestor via a diaphragm disposed in the channel of the housing of the mechanical indicator.

14. The method of claim 12, wherein coupling a mechanical indicator to the flame arrestor comprises coupling a portion of the housing of the mechanical indicator to a portion of a body of a flame arrestor including providing fluid communication between the housing of the mechanical indicator and a fluid flow path of the body of the flame arrestor.

15. The method of claim 12, further engaging a locking member disposed in the housing of the mechanical indicator with a portion of the pin, the locking member engaging a notch of the pin when the pin is in the actuated position, preventing further movement of the pin in the actuated position.

* * * * *